US010826852B2

(12) United States Patent
Jin et al.

(10) Patent No.: US 10,826,852 B2
(45) Date of Patent: Nov. 3, 2020

(54) COMMUNICATION FREQUENCY OPTIMIZATION

(71) Applicant: salesforce.com, inc., San Francisco, CA (US)

(72) Inventors: Zhao Jin, Santa Clara, CA (US); Shrestha Basu Mallick, San Francisco, CA (US); Yacov Salomon, Danville, CA (US); Kexin Xie, San Mateo, CA (US); Sheng Loong Su, Singapore (SG); Todd Swardenski, Indianapolis, IN (US); Trent Albright, Apex, NC (US); Armita Peymandoust, San Francisco, CA (US); Michael Jones, Portland, OR (US); Brian Brechbuhl, Carmel, IN (US); David Yourdon, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 65 days.

(21) Appl. No.: 16/177,271

(22) Filed: Oct. 31, 2018

(65) Prior Publication Data
US 2020/0137008 A1 Apr. 30, 2020

(51) Int. Cl.
*H04L 12/58* (2006.01)
*H04L 29/08* (2006.01)

(52) U.S. Cl.
CPC ............ *H04L 51/046* (2013.01); *H04L 51/02* (2013.01); *H04L 51/08* (2013.01); *H04L 51/12* (2013.01); *H04L 67/22* (2013.01)

(58) Field of Classification Search
CPC ....... H04L 51/046; H04L 51/02; H04L 51/08; H04L 51/12; H04L 67/22
See application file for complete search history.

(56) References Cited

U.S. PATENT DOCUMENTS

| | | | |
|---|---|---|---|
| 8,655,695 B1* | 2/2014 | Qu ..................... | G06Q 30/0251 705/14.49 |
| 10,296,521 B2* | 5/2019 | Donovan ............... | G06Q 30/02 |
| 2003/0187937 A1* | 10/2003 | Yao ......................... | H04L 51/12 709/206 |
| 2006/0235933 A1* | 10/2006 | Baluja .................. | G06Q 10/107 709/207 |
| 2016/0308897 A1* | 10/2016 | Chapman ............. | H04L 63/1483 |
| 2017/0019358 A1* | 1/2017 | Bradley .................. | H04L 51/16 |
| 2018/0018707 A1* | 1/2018 | Berry, Jr. ............ | G06Q 30/0204 |
| 2019/0213476 A1* | 7/2019 | Singh .................... | G06N 3/0445 |
| 2019/0253519 A1* | 8/2019 | Milosevic ............... | H04L 67/26 |
| 2019/0388787 A1* | 12/2019 | Padmanabhan ......... | A63F 13/47 |

* cited by examiner

*Primary Examiner* — Dhairya A Patel
(74) *Attorney, Agent, or Firm* — Holland & Hart LLP

(57) ABSTRACT

A database server may receive or monitor user engagement metadata corresponding to a plurality of communication messages transmitted to the users. The database server analyzes the metadata to determine optimal transmission frequencies for digital communication messages based on engagement rates received in the user engagement metadata.

20 Claims, 12 Drawing Sheets

COMMUNICATION FREQUENCY OPTIMIZATION

FIELD OF TECHNOLOGY

The present disclosure relates generally to database systems and data processing, and more specifically to communication frequency optimization.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may further support transmission of communication messages such as emails, notifications, etc. for marketing, news, and other purposes. The cloud platform may send the messages to a number of "subscribers," such as users that have subscribed to email list, users that have downloaded a particular application, etc. There may be a target minimum number of subscribers and a target maximum number of subscribers to reach with the messages, but there may also be limitations (e.g., technical, financial, time) on the total number of messages that the platform can send out for a given time period or from a particular entity.

DETAILED DESCRIPTION

Figure 1:
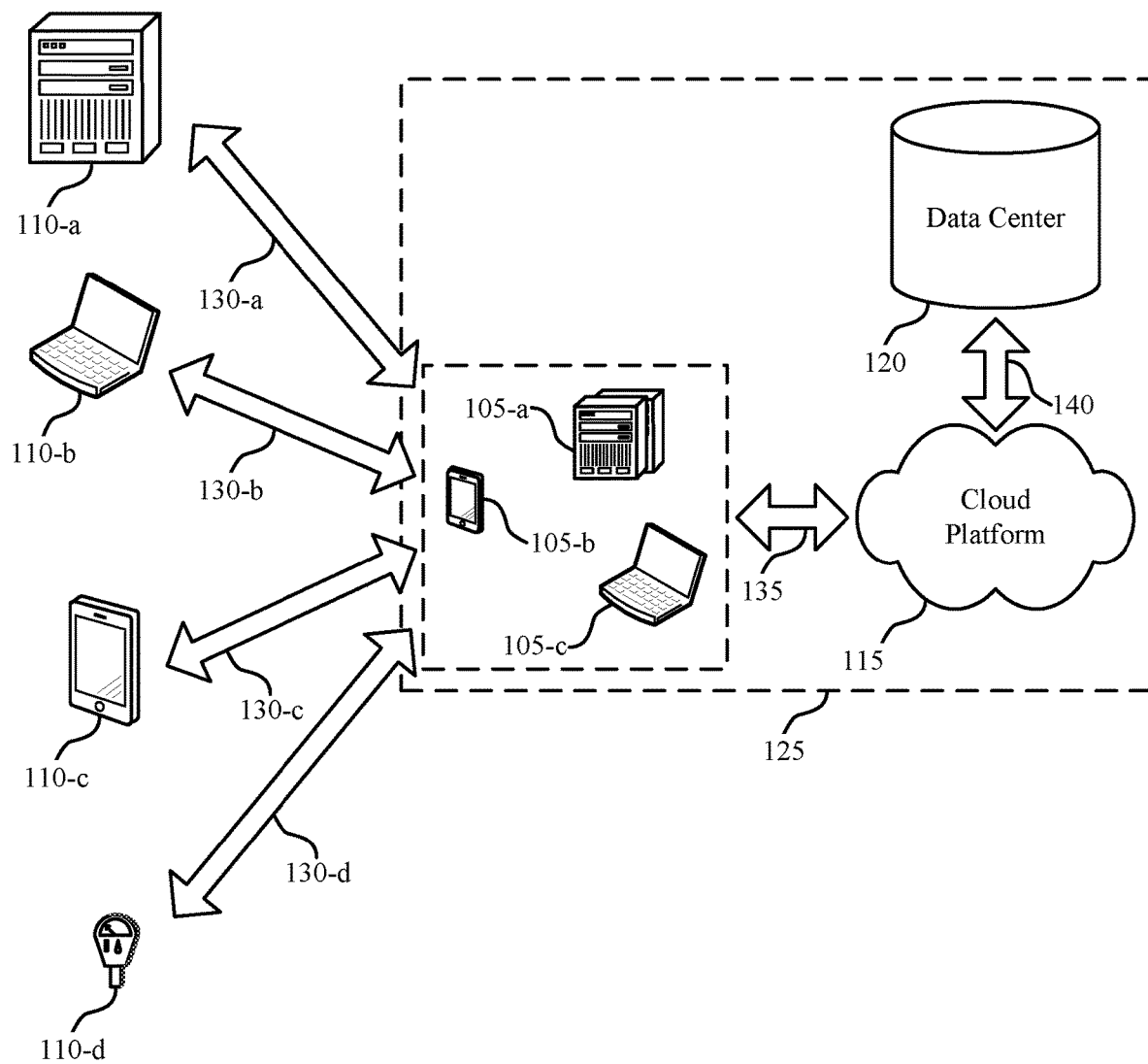
FIG. 1 illustrates an example of a system that supports communication frequency optimization in accordance with aspects of the present disclosure.

A system may support automated or user implemented transmission of digital communication messages to various "subscribers." Digital communication messages may include emails, push notifications, etc. Subscribers may be users that have subscribed to emails from an organization, users that have downloaded a particular application to a device, etc. In order to maximize interaction with such messages by users, the digital communication messages may be transmitted at certain times or at certain frequencies.

The implementations described herein provide a digital communication optimization system that analyzes past communication data to determine optimal frequencies to transmit subsequent digital communications. The system organizes past communications by transmission frequencies. For example, a group of users may receive a digital communication message five times, another group may receive the digital communication message four times, etc. Each transmission frequency group may have a unique set of users and may be analyzed to determine engagement rates, by for example analyzing metadata returned back to the sender of the messages. For example, the received five times group may be analyzed to determine open rate per message received, click rate per message received, unsubscribe rate per message received, etc. Various frequency ranges are selected from the groups. For example, a range may include the received two times group to the received four times group. The number of messages allocated to groups outside the range (e.g., five times group and one time group) are distributed (e.g., on a pro-rata basis) to the frequency groups within the range. The ranges are checked to determine whether the redistribution of messages satisfies one or more redistribution conditions. If the conditions are satisfied, then the system determines the gains in engagements based on the previously determined engagement rates/metrics. The process is repeated for a number of ranges (e.g., in some cases, all possible ranges), and an optimal range, which may have the highest total engagements after the redistribution, is selected for communication frequency. Thus, the system receives metadata describing digital communications and describing whether such communications were interacted with by a user. The system then identifies optimal communication frequencies for maximizing interaction with communications by various users. In some cases, because the system identifies optimal communication frequencies, communications are thus not wasted on suboptimal frequencies. This provides for a better utilization of communication bandwidth between communication systems and user devices.

In some cases, the system may account for a total addressable number of users. Such a limit may be based on the number of subscribers to an email group, a number of users that have downloaded an application, a price limitation for sending communications, etc. Accordingly, as users/emails are redistributed to different groups, the system determines whether the number of users needed to receive the redistributed emails in the range, based on the pro-rata distribution of emails in each frequency group in the range, plus the original number of users in the range, is below a maximum threshold. If the number of users needed to receive the redistributed emails plus the original number of users in the range exceeds a threshold, then the range may not be selected for the optimal range. Furthermore, the system may similarly account for a minimal addressable number of users, which may identify the minimum number of users to be reached. The system may determine whether a range satisfies the minimal addressable number of users.

In some implementations, the system selects a range in order to maximize the number of users that click the message, maximize the number of clicks per user receiving the digital communication message, and/or to control the number of subscribers that unsubscribe or delete applications or disable notifications associated with an application. In some cases, when selecting an optimal unsubscribe range, the system identifies when a group within a frequency range satisfies a threshold (e.g., 80% of potential unsubscribes within a group) based on identified unsubscribes from the communication metadata. If the threshold is satisfied, the group may be selected as a "center" of the range, and groups on either side are selected for the optimal range.

Aspects of the disclosure are initially described in the context of an environment supporting an on-demand database service. Aspects of the disclosure are further described with system diagrams and a process flow diagram. Aspects of the disclosure are further illustrated by and described with reference to apparatus diagrams, system diagrams, and flowcharts that relate to communication frequency optimization.

FIG. 1 illustrates an example of a system 100 for cloud computing that supports communication frequency optimization in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include a digital communication system that schedules digital communications, transmits communications, analyzes communications, etc. with the cloud clients 105 and/or the contacts 110. In some cases, the digital communication system of the cloud platform 115 includes components for monitoring and/or analyzing transmitted communications. In some cases, communications over an identified time frame are analyzed to determine optimal digital communication frequencies. Accordingly, the cloud platform may provide recommendations (e.g., or automatically transmit) for optimal communication frequencies to the cloud clients 105 for communicating with the contacts 110. In other words, the cloud platform 115 may optimize the frequencies of interactions 130 with the contacts for the cloud clients 105.

Conventional communication systems may provide automatic digital communication transmission and may provide optimal times for digital communications. However, conventional systems may not automatically monitor user interaction with transmitted digital communications and optimize subsequent transmissions based on transmission frequency. These systems lead to wasted communication bandwidth on both the device and at the communication system level because users may not interact with communications that are not optimized based on frequency. Furthermore, organizations may have a limited amount of messages that the organization is able to send, thus, optimal communications that maximize user interactions is desired.

In contrast, the system 100 supports a digital communication system that identifies optimal digital communication frequencies based on past digital communication transmissions. The system 100 identifies frequency groups, a number of communications transmitted per frequency group, and engagement rates per frequency group based on metadata describing past digital communications. The system 100 then identifies a number of frequency ranges that include multiple frequency groups, redistributes emails from groups outside the range to groups within the range, and predicts engagement frequencies based on the prior identified engagement rates. The system 100 may repeat the process for a number of ranges, and then select the optimal range. The system 100 accounts for maximum and minimum thresholds, which may be identified by a user or identified based on prior communication data. Accordingly, the system 100 identifies optimal communication ranges and recommends such ranges to a user or administrator of a cloud client 105.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, use of the described implementations, a user is a marketing coordinator of a cloud client 105. The user utilizes the system to identify optimal communication ranges for a marketing campaign to a number of email subscribers. The user may identify a maximum number of emails that the coordinator is permitted to send and a minimum number of people that the coordinator desires to reach. The system 100 analyzes or monitors prior email data, which includes data identifying interaction with the email (e.g., whether a user opened, clicked, or unsubscribed to the email list), and the number of emails transmitted to each user (e.g., the frequencies). The system organizes and normalizes the email data and identifies optimal communication frequencies as described herein. The user can then select to run the marketing campaign according to the identified ranges to maximize user engagement. The marketing campaign may be similarly analyzed to further optimize for a next marketing campaign.

Figure 2:
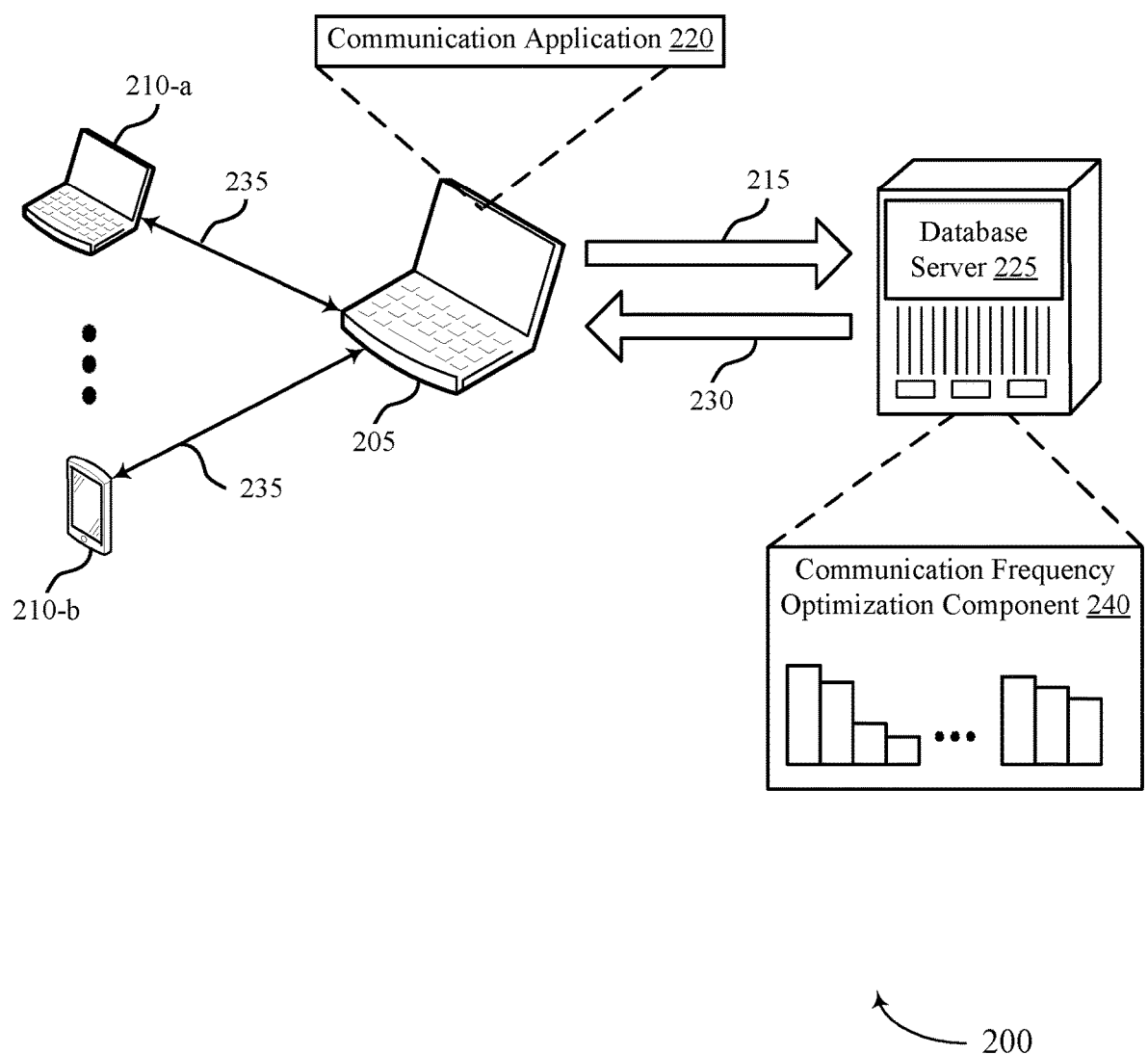
FIG. 2 illustrates an example of a system that supports communication frequency optimization in accordance with aspects of the present disclosure.

FIG. 2 illustrates an example of a system 200 that supports communication frequency optimization in accordance with aspects of the present disclosure. The system 200 includes a number of subscriber devices 210, a client device 205, and a database server 225. The subscriber devices 210, which may be example of contacts 105 of FIG. 1, correspond to users that have subscribed to an email list, downloaded an application that receives notifications, or otherwise receive digital communications on such devices 210. The client device 205, which may be an example of a cloud client 105 of FIG. 1, executes a communication application 220 that is used to manage and transmit digital communications 235 to the subscriber device. The client device 205 may transmit the communications 235 via the database server 225 or another serving component. The database server 225, which may include examples of components of the subsystem 125 of FIG. 1, receives and/or monitors the digital communications via the communication link 215.

Figure 5:
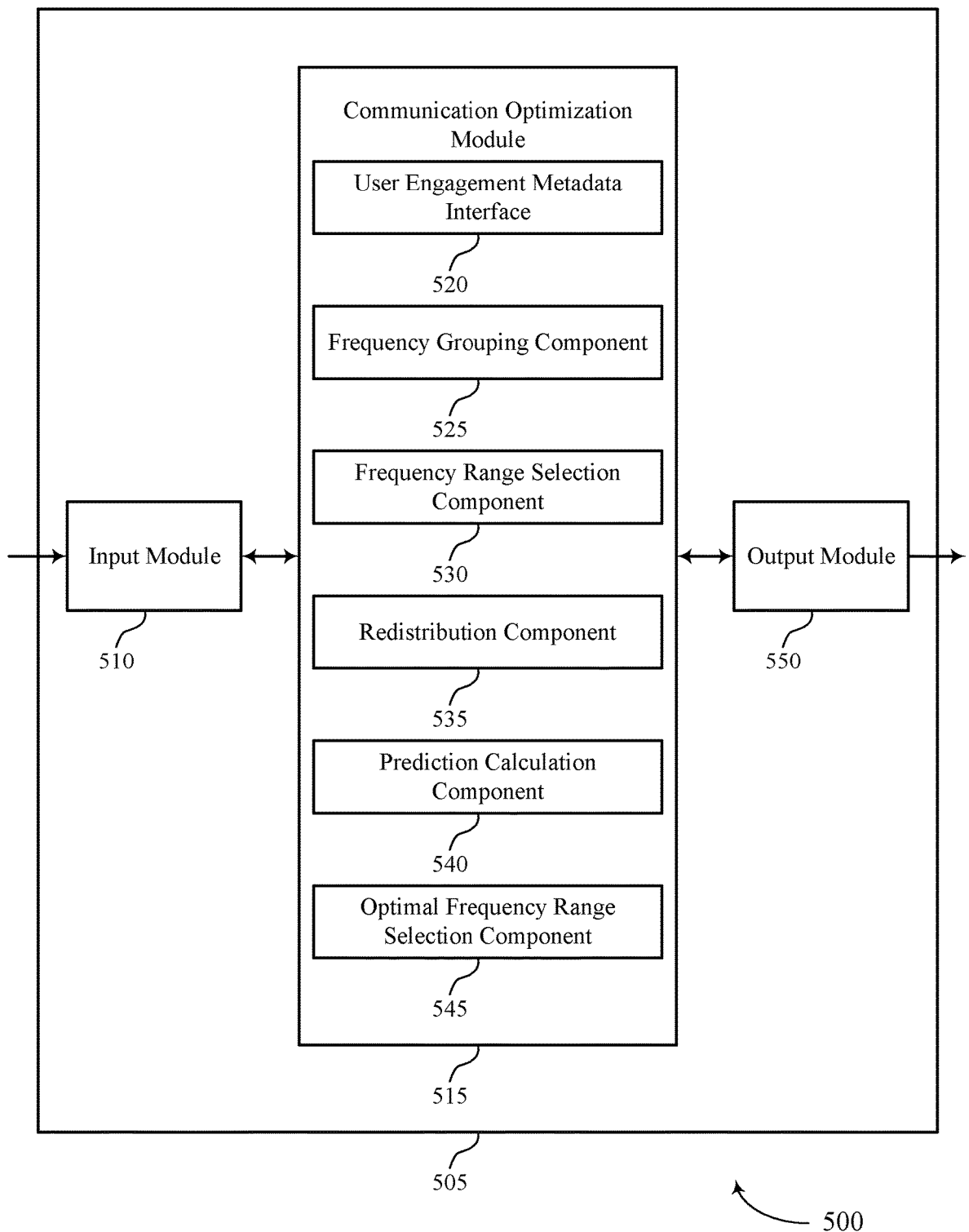
FIG. 5 shows a block diagram of an apparatus that supports communication frequency optimization in accordance with aspects of the present disclosure.

The database server 225 executes a communication frequency optimization component 240, which may be an example of the communication frequency optimization module 515 of FIG. 5. The communication frequency optimization component 240 identifies optimal digital communication frequency ranges based on the communications 235. The communication frequency optimization component 240 organizes the digital communications using event data and may organize the communications 235 by job, enterprise, business unit, batch identifier, email type (e.g., marketing v. operational), etc.

The communication frequency optimization component 240 may organize the past digital communications into frequency groups where each frequency group represents a number of messages sent to users in the group. For example, a frequency group five includes the number of users (e.g., devices 210) that received digital communication messages five times. Thus, the frequency group five also indicates the number of messages total transmitted to users five times (e.g., the number of users*5). For each frequency group, the optimization component 240 identifies the engagement rate for communication messages in the group. For example, the optimization component 240 identifies the rate of subscribers opening at least a message per message sent in the frequency group. Other example engagement rate metrics include click rate (e.g., the rate of users or subscribers opening a message per message sent in the group), unsubscribe (e.g., the rate of users or subscribers unsubscribing per message sent in the group), delete rate (e.g., the rate of users or subscribers deleting an application per message sent in the group), etc.

The communication frequency optimization component 240 may normalize the data by smoothing the data using a moving average. The smoothed data may include the number of messages per group and the engagement rates per group. The communication frequency optimization component 240 may then select a set of ranges to test for optimization. The selected ranges may be all potential ranges, or ranges may be selected based on range limiting metrics (e.g., at least three frequency groups). For each selected range, the communication frequency optimization component 240 redistributes the messages from frequency groups outside the range to groups within the range on a pro-rata basis. For example, if a range is from frequencies of 4 to 8 of a maximum of 10 frequencies, the messages from frequencies 1-3 and 9-10 are redistributed to the groups 4, 5, 6, 7, and 8 on a pro-rata basis. The communication frequency optimization component 240 may determine whether the number of messages within the range satisfies redistribution conditions (e.g., maximum and minimum thresholds) and may compute the potential new users conducting engagement activities based on the previously determined engagement rates for each group. The process may be repeated for a plurality of frequency ranges, and the system may identify the optimal range (e.g., the greatest number of total engagements or new engagements) from the plurality of ranges. The optimal range may be transmitted to the client device 205 via a communication link 230.

In some cases, the communication optimization component 240 identifies an optimal "unsubscribe" range using the methodology described herein. It should be understood that the unsubscribe range refers to range that minimizes unsubscribes to email lists, deletion of applications, disablement of notifications, etc. In some cases, the communication optimization component 240 identifies the unsubscribe range by iterating through the frequency groups of past communication data from group 1 to group n, calculating a rolling sum of unsubscribes in the groups, and identifying a frequency group where the rolling sum reaches a threshold level of unsubscribes (e.g., 80% of the total unsubscribes). The frequency group where the threshold level of unsubscribes is reached may be selected as the center (n) of the optimal unsubscribe range, and the range may be selected as n−2 groups and n+2 groups. Accordingly, the communication optimization component 240 recommends not sending digital communication message to users at a frequency greater than the upper bound of the range (n−2 to n+2) to minimize unsubscribes, deletions, or disabling of notifications.

Figure 3:
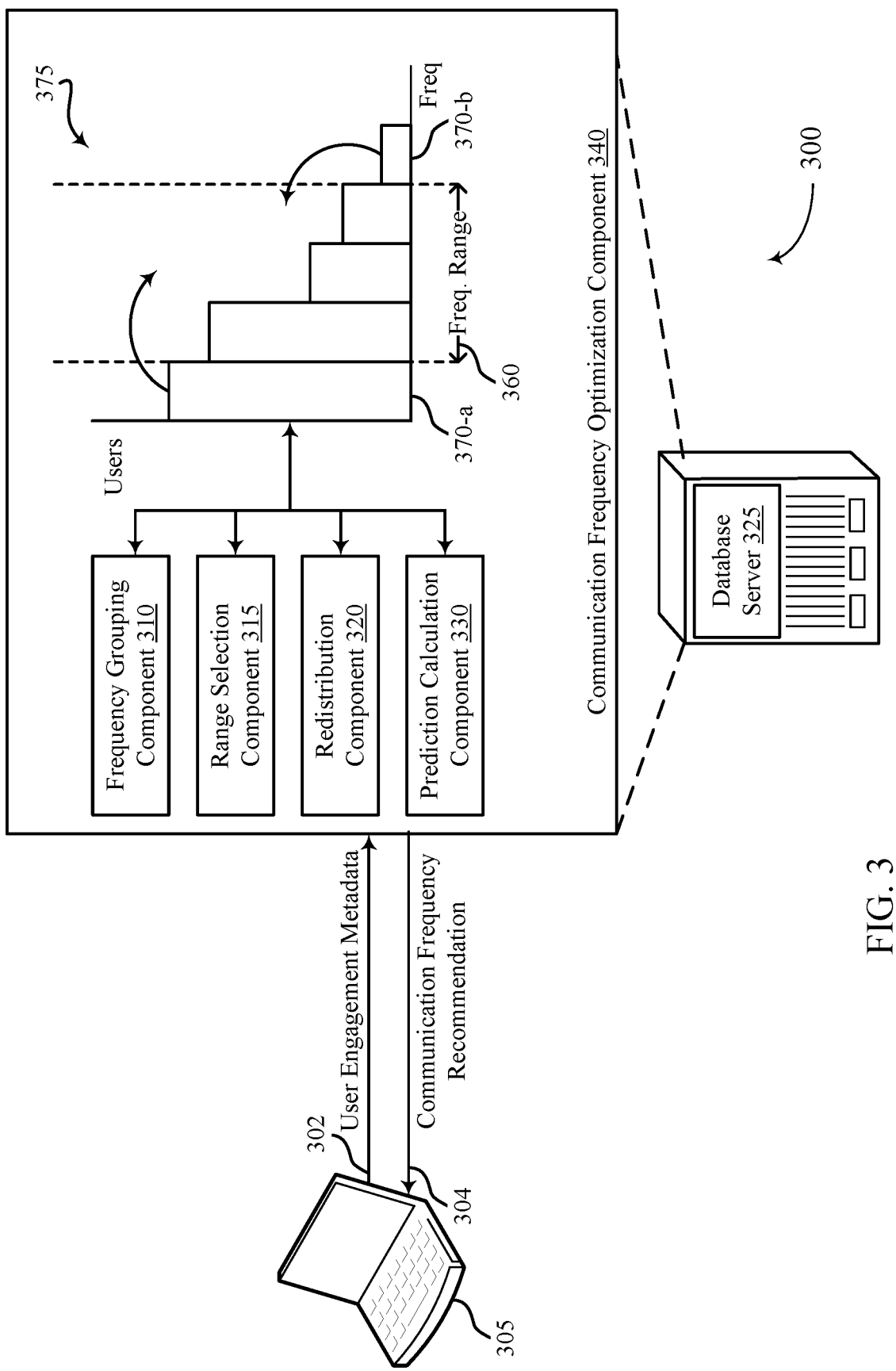
FIG. 3 illustrates an example of a system that supports communication frequency optimization in accordance with aspects of the present disclosure.

FIG. 3 illustrates an example of a system 300 that supports communication frequency optimization in accordance with aspects of the present disclosure. The system includes a client device 305 and a database server 325. The client device 305 may be an example of a client device 205 of FIG. 2 or a cloud client 105 of FIG. 1. The database server 325 may be an example of a database server 225 of FIG. 2 or components of the subsystem 125 of FIG. 1. The database server 325 receives user engagement metadata 302 corresponding to digital communications sent to subscriber devices of the client device 305 or associated devices. The user engagement metadata indicates interaction with digital communication message by users of the subscriber devices (e.g., the subscriber devices 210 of FIG. 2).

The database server 325 executes a communication frequency optimization component 340, which may be an example of the communication frequency optimization component of FIG. 2. A frequency grouping component 310 and groups the user engagement metadata based on a number of factors. In an implementation for emails, the user engagement metadata 302 includes send data and engagement data (e.g., open, click, and unsubscribe). The send data may be analyzed by the frequency grouping component 310 to identify enterprise ID, business unit ID, job ID, email list ID, batch ID, transaction time, subscriber ID, etc. In some cases, the frequency grouping component 310 determines whether an event is the first unique action for an email, where an email has a unique combination of the metadata including policy ID, enterprise ID, etc. The email data is injected and parsed to identify email data within relevant time frames (e.g., 30, 60, 90 days). The send data and the engagement data are combined such that the engagement data is relevant to the different business units, event type, email type, time frame, etc. The number of subscriber emails are counted such that the number of subscribers doing the engagement activity per email sent to a subscriber is identified.

The frequency optimization component 340 identifies a set of transmission frequency groups (e.g., transmission frequency groups 370), a number of digital communication messages corresponding to each frequency group, and an engagement rate for each group of the set of transmission frequency groups based on the received and/or organized data. The number of digital communication messages in a frequency group may be determined based on the number of users/subscribers in a group (e.g., the number of users that received a message x times)*the frequency (e.g., x). For example, if the received a message five times group has 50 users, then the total number of messages in the group is 50*5=250 digital communication messages. A frequency chart 375 illustrates frequency groups 370 and the number of users per frequency group 370. The engagement rates for a frequency range may be determined by the number of users in a frequency group that engage with digital communication messages (e.g., opened, clicked, unsubscribed, deleted) divided by the total number of messages in the frequency group.

The frequency grouping component 310 may also normalize the data by smoothing the data based on a moving average. For example, the number of emails per frequency group may be smoothed. In some cases, the engagement rates for reach group are smoothed by the frequency grouping component 310. In smoothing the data, the engagement rate and/or number of communication messages for at least one frequency group may be adjusted.

A range selection component 315 of the communication frequency optimization component selects a plurality of frequency ranges from the frequency groups 370. All possible frequency ranges may be selected as the plurality of ranges, or the ranges may be selected on a range limiting basis. An example frequency range 360 is illustrated in the frequency chart 375. For each selected frequency range, a redistribution component 320 redistributes messages from frequency groups outside the range to groups within the range on a pro-rata basis. For example, in the frequency chart 375, the messages from the frequency groups 370-a and 370-b are distributed to the frequency groups within the frequency range 360-b (as illustrated by arrows). Furthermore, during redistribution, the redistribution component 320 determines whether the frequency range satisfies relevant thresholds. For example, the redistribution component 320 determines whether the number of users to receive the redistributed messages plus the original number of users within the range is below the total number of addressable users. The total number of addressable users may be based on the total number of subscribers from all frequency groups. If the range contains one frequency group that receives six emails and if the total number of messages is 2400 in that group (2000 original messages in the group+ 400 redistributed messages received), then the total number of users needed is 400 (2400/6) in this group. If the total addressable market is 350, which is the total number of users from frequency group 6 and the other groups outside this range before the redistribution, then the range does not satisfy the total number of addressable users threshold. Similarly, the, redistribution component 320 may consider a minimum number of users threshold. The minimum number of users threshold may be based on a number of users that a market wishes to target, for example. In some cases, the range selection component may consider the number of messages that the communication component is able to send (e.g., a budget based on price).

During redistribution, the prediction calculation component 330 determines, for each frequency range (with redistributions) a predicted total number of subscribers conducting the engagement activity based on the previously determined engagement rates for the frequency groups within the frequency range and using the number of additional messages added to each group. For example, if three groups (group 4, group 5, and group 6) are to receive 1000 redistributed emails and the groups have 100, 200, and 200 emails, respectively, then group 4 receives 200 emails, group 5 receives 400 emails, and group 6 receives 400 emails (e.g., pro-rata) provided the thresholds are satisfied. The predicted engagement rate may be calculated as:

(200*engagement rate for group 4)+(400*engagement rate for group 5)+(400*engagement rate for group 6)

Accordingly, the predicted total number of subscribers conducting the engagement activity is calculated for each frequency range. The range with the best or highest engagement rate (or lowest for unsubscribes) may be selected as the optimal range and recommended to a user. The prediction calculation component 330 may calculate different engagement metrics including the subscribers that open or click messages, number of subscribers that unsubscribe to email lists or delete applications, etc. for a number of time frames, and the metrics may be calculated periodically (e.g., every day). Thus, recommended ranges may be identified periodically. The recommended ranges may be transmitted from the database server 325 to the client device 305 as a communication frequency recommendation 304. In some cases, messages may be automatically transmitted to subscriber devices according to the range.

In some cases, the communication optimization component 340 identifies an optimal "unsubscribe" range using the methodology described herein. It should be understood that the unsubscribe range refers to range that controls or limits unsubscribes to email lists, deletion of applications, disablement of notifications, etc. In some cases, the communication optimization component 340 identifies the unsubscribe range by iterating through the frequency groups of past communication data from 1 to n, calculating a rolling sum of unsubscribes in the groups, and identifying a frequency group where the rolling sum reaches a threshold level of unsubscribes (e.g., 80% of the total unsubscribes). The frequency group where the threshold level of unsubscribes is reached may be selected as the center (n) of the optimal unsubscribe range, and the range may be selected as n−2 groups and n+2 groups. In FIG. 3, the prediction calculation component 330 may start with group 370-a (group with lowest frequency) and determine unsubscribes based on the number of un-subscribers obtained from the event data, move to the next frequency group and add the unsubscribes from this group to the previous number of unsubscribes, etc. When the total number of unsubscribes reaches a threshold (e.g., 80% of total unsubscribes for the dataset), then the current frequency group is selected as a center (e.g., n) of the recommended range, which may include the center−2 and the center+2. Accordingly, the communication optimization component 240 recommends not sending digital communication messages to users at a frequency greater than the upper bound of the range (n−2 to n+2) to minimize unsubscribes, deletions, or disabling of notifications.

Figure 4:
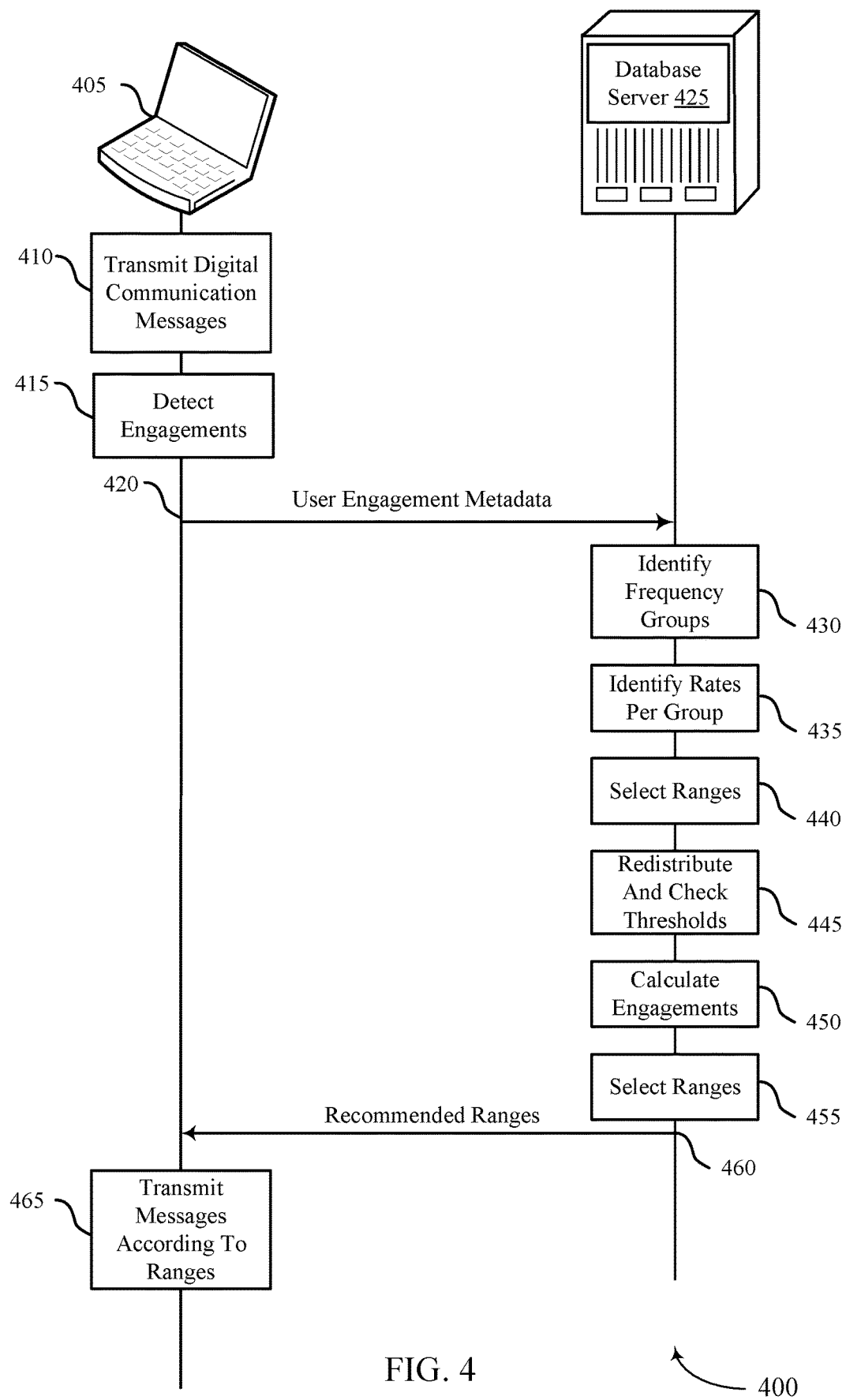
FIG. 4 illustrates an example of a process flow diagram that supports communication frequency optimization in accordance with aspects of the present disclosure.

FIG. 4 illustrates an example of a process flow diagram 400 that supports communication frequency optimization in accordance with aspects of the present disclosure. The process flow diagram 400 includes a client device 405 and a database server 425, which may be examples of such devices as described herein. At 410, the client device 405 transmits digital communication messages to subscriber devices. The digital communication messages are emails, notifications, push messages, etc. The messages may be sent via database server 425 or another communication server. At 415, the client device detects engagements 415 with the transmitted messages. The engagements may include clicks of the messages, openings of messages, deletion of messages, unsubscribes to email lists, etc. At 420, the user engagement metadata is transmitted from the client device 405 to the database server 425.

The database server 425 receives the user engagement metadata, which corresponds to a plurality of digital communications transmitted by the client device 405 or associated devices to a plurality of users. The metadata indicates interaction via user interface of subscriber devices (e.g., touch screen devices) with digital communication message (e.g., displayed messages) associated with the transmitted digital communications. At 430, the database server identifies a set of transmission frequency groups for the plurality of digital communications, a number of digital communication messages corresponding to each transmission group of the set, and an engagement rate for each transmission frequency group of the set. The engagement rate is based at least in part on the received user engagement metadata.

At 440, the database server 425 selects a plurality of frequency ranges from the set of transmission frequency groups. At 445, for each transmission frequency range of the plurality of ranges, a number of communication messages from each transmission frequency group of the set of transmission frequency groups outside the transmission frequency range are redistributed to transmission frequency groups within the transmission frequency range. The database server 425 may check the total number of subscribers for each range after the redistribution to determine whether one or more redistribution conditions are satisfied. The redistribution conditions may be a maximum number of users, a minimum number of users, or a combination thereof.

At, 450, the database server 425 calculates, for each transmission frequency range of the plurality of ranges, predicted engagements (e.g., the total number of users or subscribers that open or click within a range after redistribution). The predicted engagement is based at least in part on the redistributed number of digital communication messages into the ranges and the identified engagement rates for the groups within the ranges. At 455 the database server 425 selects a range based on the predicted engagement. At 460, the database server 225 transmits the recommended ranges to the client device 405. At 465, the client device may transmit more communication messages according to the predicted frequencies.

FIG. 5 shows a block diagram 500 of an apparatus 505 that supports communication frequency optimization in accordance with aspects of the present disclosure. The apparatus 505 may include an input module 510, a communication optimization module 515, and an output module 550. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the communication optimization module 515 to support communication frequency optimization. In some cases, the input module 510 may be a component of an input/output (I/O) controller 715 as described with reference to FIG. 7.

The communication optimization module 515 may include an user engagement metadata interface 520, a frequency grouping component 525, a frequency range selection component 530, a redistribution component 535, a prediction calculation component 540, and an optimal frequency range selection component 545. The communication optimization module 515 may be an example of aspects of the communication optimization module 605 or 710 described with reference to FIGS. 6 and 7.

The communication optimization module 515 and/or at least some of its various sub-components may be implemented in hardware, software executed by a processor, firmware, or any combination thereof. If implemented in software executed by a processor, the functions of the communication optimization module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communication optimization module 515 and/or at least some of its various sub-components may be physically located at various positions, including being distributed such that portions of functions are implemented at different physical locations by one or more physical devices. In some examples, the communication optimization module 515 and/or at least some of its various sub-components may be a separate and distinct component in accordance with various aspects of the present disclosure. In other examples, the communication optimization module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The user engagement metadata interface 520 may receive user engagement metadata corresponding to a set of digital communications transmitted to a set of users, the user engagement metadata indicating interaction, via a user interface of a user device, with a digital communication message associated with each of the set of digital communications.

The frequency grouping component 525 may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata.

The frequency range selection component 530 may select a set of transmission frequency ranges from the set of transmission frequency groups.

The redistribution component 535 may redistribute, for each transmission frequency range of the set of transmission frequency ranges, a number of communication messages from each transmission frequency group of the set of transmission frequency groups outside of the transmission frequency range to transmission frequency groups within the transmission frequency range.

The prediction calculation component 540 may calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range.

The optimal frequency range selection component 545 may select a range of the set of transmission frequency ranges based on the predicted engagement rate.

The output module 550 may manage output signals for the apparatus 505. For example, the output module 550 may receive signals from other components of the apparatus 505, such as the communication optimization module 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
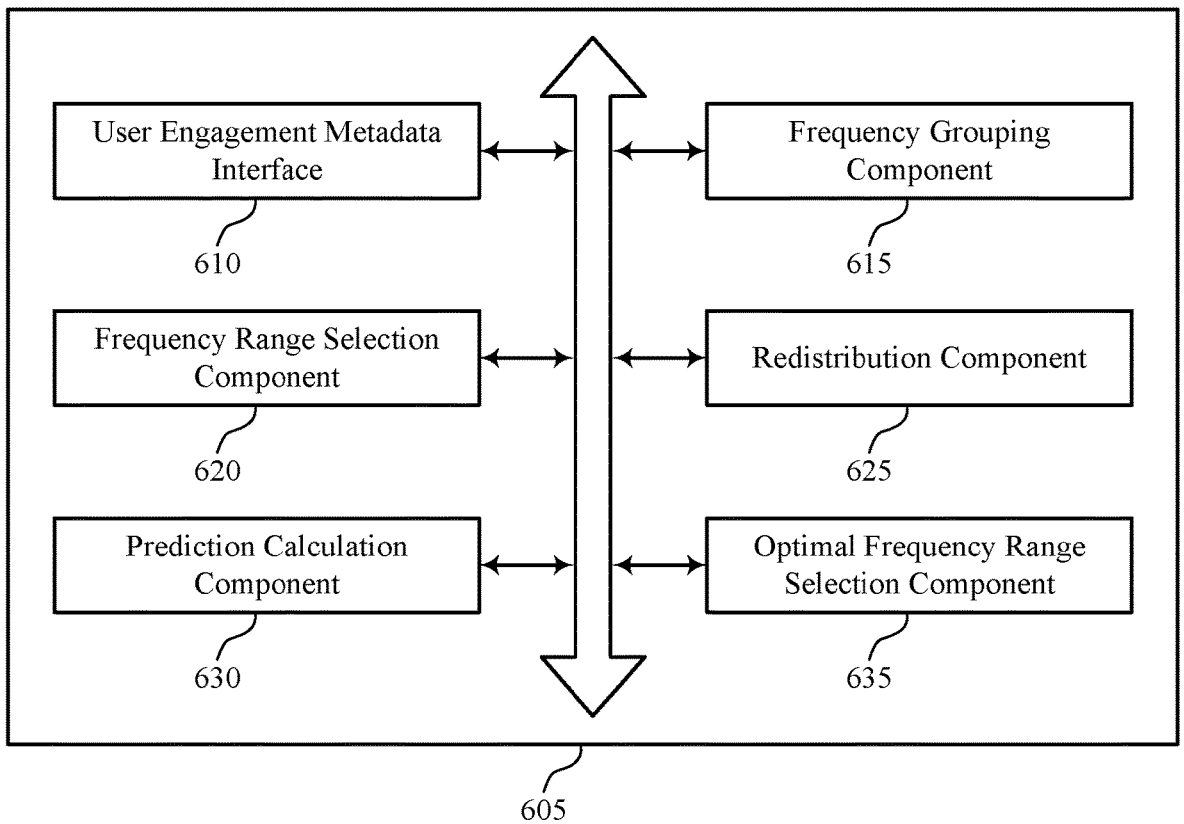
FIG. 6 shows a block diagram of a communication optimization module that supports communication frequency optimization in accordance with aspects of the present disclosure.

FIG. 6 shows a block diagram 600 of a communication optimization module 605 that supports communication frequency optimization in accordance with aspects of the present disclosure. The communication optimization module 605 may be an example of aspects of a communication optimization module 515 or a communication optimization module 710 described herein. The communication optimization module 605 may include an user engagement metadata interface 610, a frequency grouping component 615, a frequency range selection component 620, a redistribution component 625, a prediction calculation component 630, and an optimal frequency range selection component 635. Each of these modules may communicate, directly or indirectly, with one another (e.g., via one or more buses).

The user engagement metadata interface 610 may receive user engagement metadata corresponding to a set of digital communications transmitted to a set of users, the user engagement metadata indicating interaction, via a user interface of a user device, with a digital communication message associated with each of the set of digital communications.

The frequency grouping component 615 may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata.

In some examples, the frequency grouping component 615 may calculate a moving average of the number of digital communication messages for each transmission frequency group of the set of transmission frequency groups.

In some examples, the frequency grouping component 615 may adjust the number of digital communication messages for at least one transmission frequency group of the set of transmission frequency groups based on the moving average.

In some examples, the frequency grouping component 615 may calculate a moving average of the engagement rate for each transmission frequency group of the set of transmission frequency groups.

In some examples, the frequency grouping component 615 may adjust the engagement rate for at least one transmission frequency group of the set of transmission frequency groups based on the moving average.

The frequency range selection component 620 may select a set of transmission frequency ranges from the set of transmission frequency groups.

The redistribution component 625 may redistribute, for each transmission frequency range of the set of transmission frequency ranges, a number of communication messages from each transmission frequency group of the set of transmission frequency groups outside of the transmission frequency range to transmission frequency groups within the transmission frequency range.

In some examples, the redistribution component 625 may determine whether the number of digital communication messages, within each transmission frequency range, satisfies at least one redistribution condition.

In some examples, the redistribution component 625 may redistribute the number of digital communication messages on a pro-rata basis.

The prediction calculation component 630 may calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range.

The optimal frequency range selection component 635 may select a range of the set of transmission frequency ranges based on the predicted engagement rate.

In some examples, the optimal frequency range selection component 635 may select the range of the set of transmission frequency ranges based on maximizing the number of clicks per user receiving a transmitted digital communication message.

In some examples, the optimal frequency range selection component 635 may select the range of the set of transmission frequency ranges based on a maximizing the number of opened messages per user receiving a transmitted digital communication message.

In some examples, the optimal frequency range selection component 635 may select the range of the set of transmission frequency ranges based on a minimizing the number of unsubscribes per user receiving a transmitted digital communication message.

In some examples, the optimal frequency range selection component 635 may determine whether at least one frequency group of the set of transmission frequency ranges range includes a number of unsubscribes over a threshold level of unsubscribes.

In some examples, the optimal frequency range selection component 635 may select the ranged based on the least one frequency group including the number of unsubscribes over a threshold level of unsubscribes.

Figure 7:
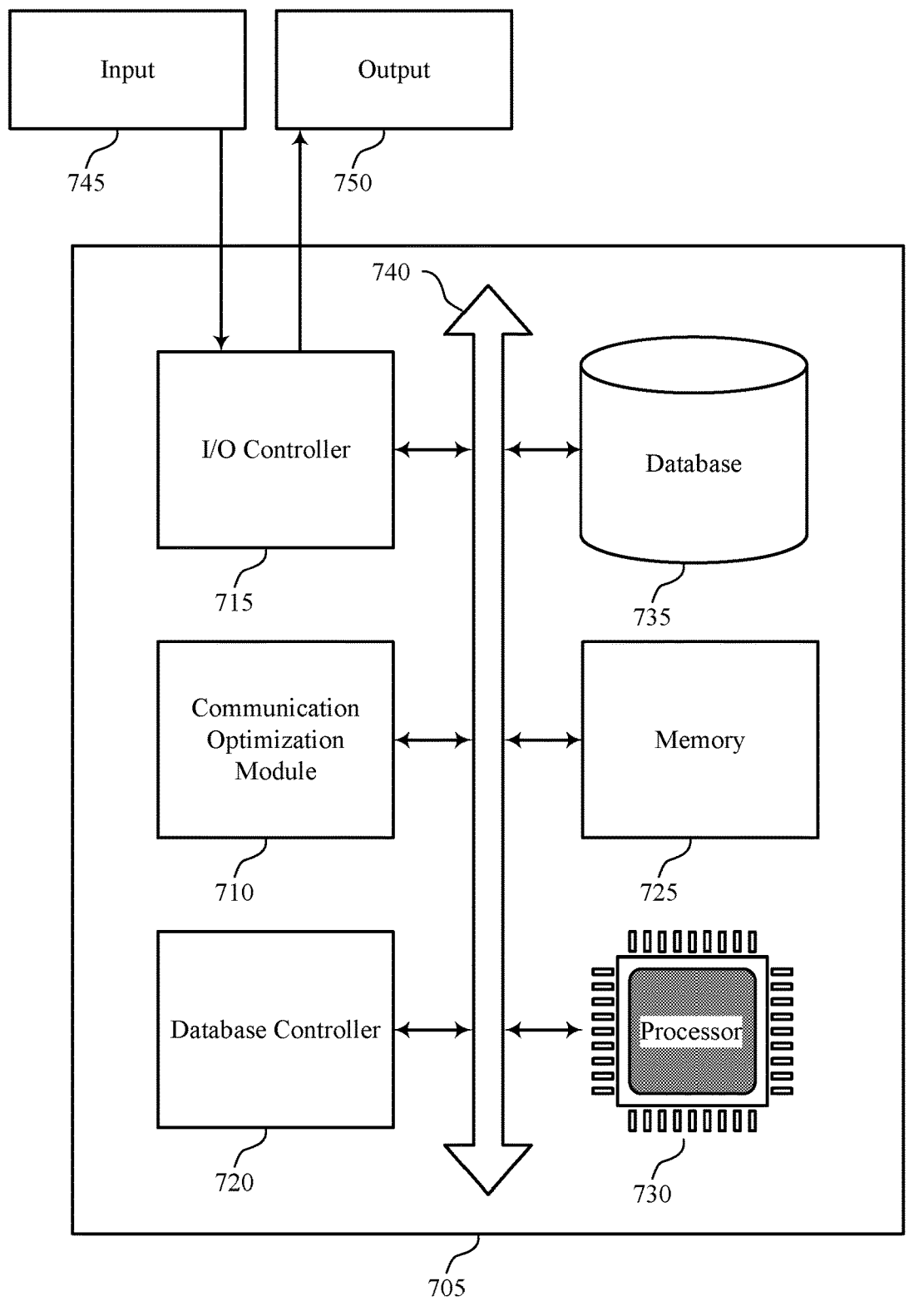
FIG. 7 shows a diagram of a system including a device that supports communication frequency optimization in accordance with aspects of the present disclosure.

FIG. 7 shows a diagram of a system 700 including a device 705 that supports communication frequency optimization in accordance with aspects of the present disclosure. The device 705 may be an example of or include the components of a database server or an apparatus 505 as described herein. The device 705 may include components for bi-directional data communications including components for transmitting and receiving communications, including a communication optimization module 710, an I/O controller 715, a database controller 720, memory 725, a processor 730, and a database 735. These components may be in electronic communication via one or more buses (e.g., bus 740).

The communication optimization module 710 may be an example of a communication optimization module 515 or 605 as described herein. For example, the communication optimization module 710 may perform any of the methods or processes described herein with reference to FIGS. 5 and 6. In some cases, the communication optimization module 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting communication frequency optimization).

Figure 8:
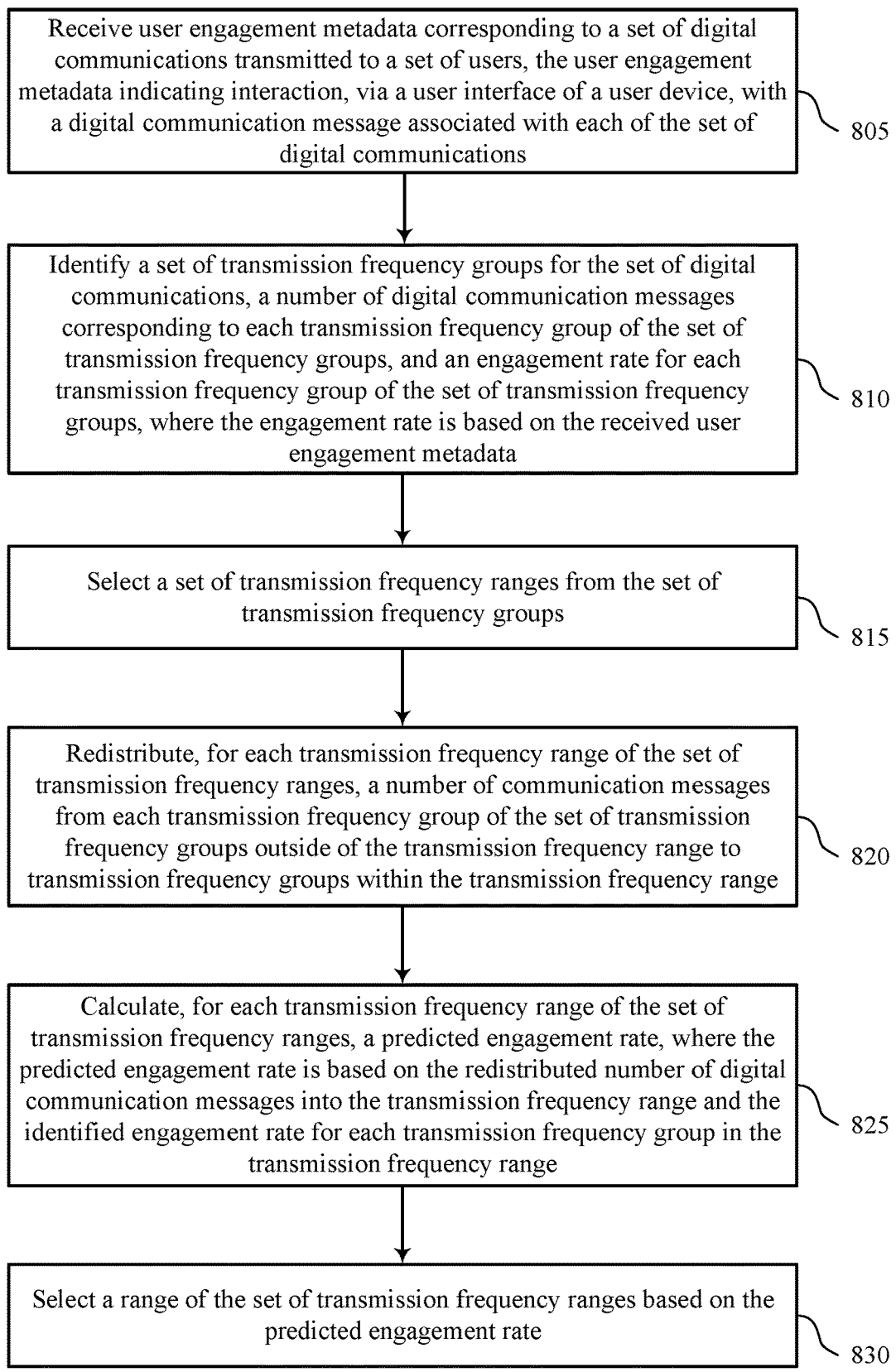
FIGS. 8 through 12 show flowcharts illustrating methods that support communication frequency optimization in accordance with aspects of the present disclosure.

FIG. 8 shows a flowchart illustrating a method 800 that supports communication frequency optimization in accordance with aspects of the present disclosure. The operations of method 800 may be implemented by a database server or its components as described herein. For example, the operations of method 800 may be performed by a communication optimization module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 805, the database server may receive user engagement metadata corresponding to a set of digital communications transmitted to a set of users, the user engagement metadata indicating interaction, via a user interface of a user device, with a digital communication message associated with each of the set of digital communications. The operations of 805 may be performed according to the methods described herein. In some examples, aspects of the operations of 805 may be performed by a user engagement metadata interface as described with reference to FIGS. 5 through 7.

At 810, the database server may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata. The operations of 810 may be performed according to the methods described herein. In some examples, aspects of the operations of 810 may be performed by a frequency grouping component as described with reference to FIGS. 5 through 7.

At 815, the database server may select a set of transmission frequency ranges from the set of transmission frequency groups. The operations of 815 may be performed according to the methods described herein. In some examples, aspects of the operations of 815 may be performed by a frequency range selection component as described with reference to FIGS. 5 through 7.

At 820, the database server may redistribute, for each transmission frequency range of the set of transmission frequency ranges, a number of communication messages from each transmission frequency group of the set of transmission frequency groups outside of the transmission frequency range to transmission frequency groups within the transmission frequency range. The operations of 820 may be performed according to the methods described herein. In some examples, aspects of the operations of 820 may be performed by a redistribution component as described with reference to FIGS. 5 through 7.

At 825, the database server may calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range. The operations of 825 may be performed according to the methods described herein. In some examples, aspects of the operations of 825 may be performed by a prediction calculation component as described with reference to FIGS. 5 through 7.

At 830, the database server may select a range of the set of transmission frequency ranges based on the predicted engagement rate. The operations of 830 may be performed according to the methods described herein. In some examples, aspects of the operations of 830 may be performed by an optimal frequency range selection component as described with reference to FIGS. 5 through 7.

Figure 9:
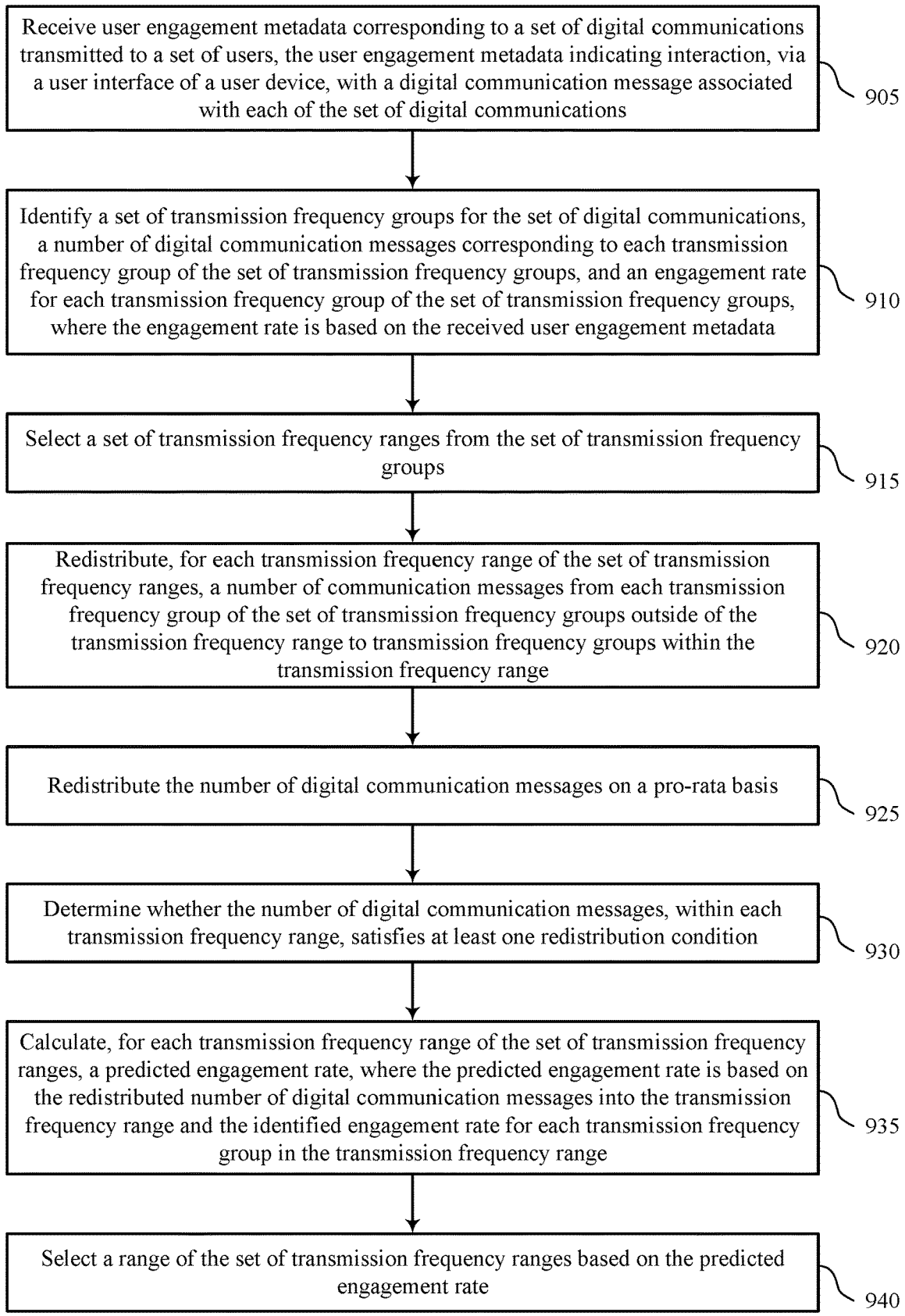

FIG. 9 shows a flowchart illustrating a method 900 that supports communication frequency optimization in accordance with aspects of the present disclosure. The operations of method 900 may be implemented by a database server or its components as described herein. For example, the operations of method 900 may be performed by a communication optimization module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 905, the database server may receive user engagement metadata corresponding to a set of digital communications transmitted to a set of users, the user engagement metadata indicating interaction, via a user interface of a user device, with a digital communication message associated with each of the set of digital communications. The operations of 905 may be performed according to the methods described herein. In some examples, aspects of the operations of 905 may be performed by an user engagement metadata interface as described with reference to FIGS. 5 through 7.

At 910, the database server may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata. The operations of 910 may be performed according to the methods described herein. In some examples, aspects of the operations of 910 may be performed by a frequency grouping component as described with reference to FIGS. 5 through 7.

At 915, the database server may select a set of transmission frequency ranges from the set of transmission frequency groups. The operations of 915 may be performed according to the methods described herein. In some examples, aspects of the operations of 915 may be performed by a frequency range selection component as described with reference to FIGS. 5 through 7.

At 920, the database server may redistribute, for each transmission frequency range of the set of transmission frequency ranges, a number of communication messages from each transmission frequency group of the set of transmission frequency groups outside of the transmission frequency range to transmission frequency groups within the transmission frequency range. The operations of 920 may be performed according to the methods described herein. In some examples, aspects of the operations of 920 may be performed by a redistribution component as described with reference to FIGS. 5 through 7.

At 925, the database server may redistribute the number of digital communication messages on a pro-rata basis. The operations of 925 may be performed according to the methods described herein. In some examples, aspects of the operations of 925 may be performed by a redistribution component as described with reference to FIGS. 5 through 7.

At 930, the database server may determine whether the number of digital communication messages, within each transmission frequency range, satisfies at least one redistribution condition. The operations of 930 may be performed according to the methods described herein. In some examples, aspects of the operations of 930 may be performed by a redistribution component as described with reference to FIGS. 5 through 7.

At 935, the database server may calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range. The operations of 935 may be performed according to the methods described herein. In some examples, aspects of the operations of 935 may be performed by a prediction calculation component as described with reference to FIGS. 5 through 7.

At 940, the database server may select a range of the set of transmission frequency ranges based on the predicted engagement rate. The operations of 940 may be performed according to the methods described herein. In some examples, aspects of the operations of 940 may be performed by an optimal frequency range selection component as described with reference to FIGS. 5 through 7.

Figure 10:
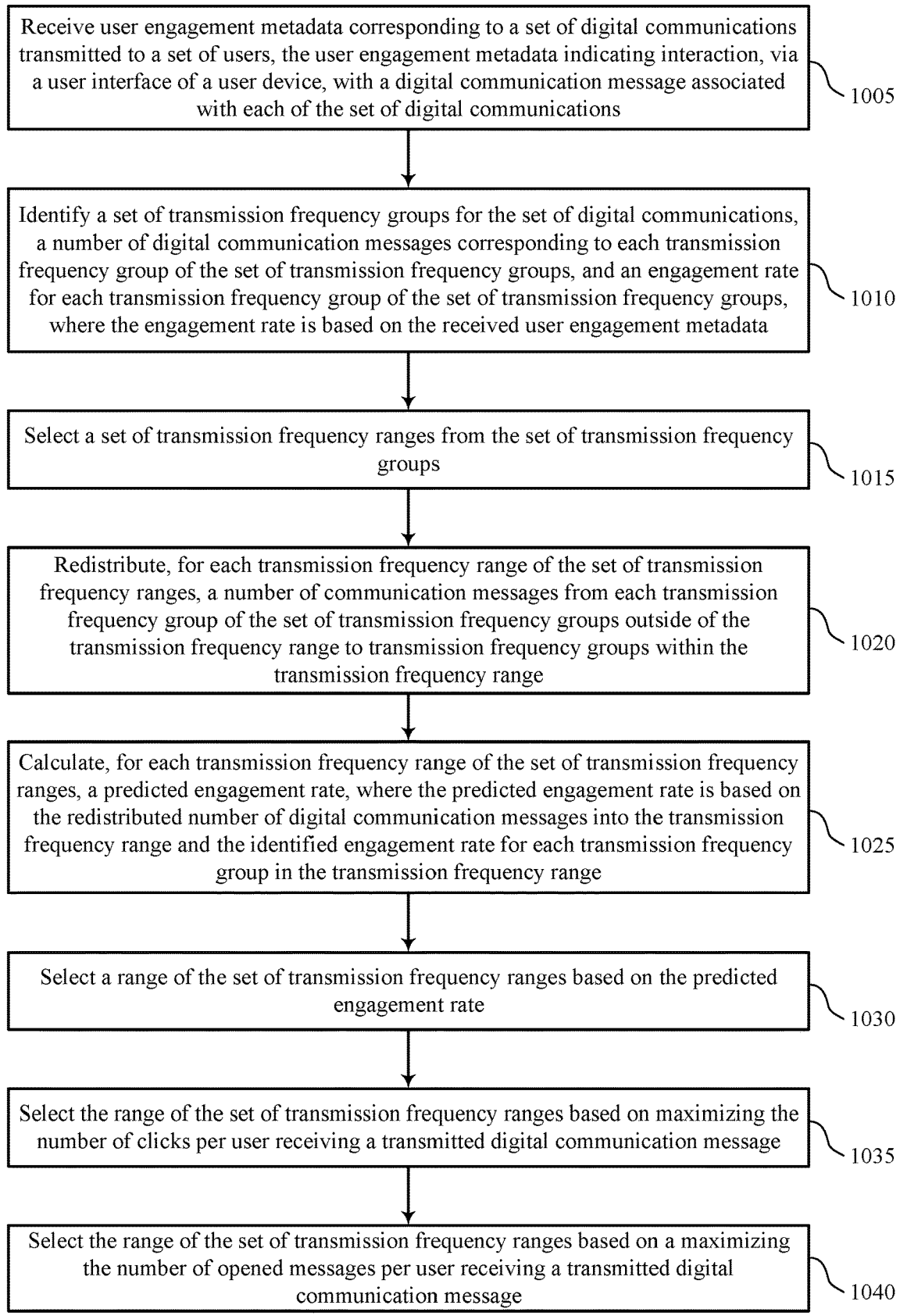

FIG. 10 shows a flowchart illustrating a method 1000 that supports communication frequency optimization in accordance with aspects of the present disclosure. The operations of method 1000 may be implemented by a database server or its components as described herein. For example, the operations of method 1000 may be performed by a communication optimization module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1005, the database server may receive user engagement metadata corresponding to a set of digital communications transmitted to a set of users, the user engagement metadata indicating interaction, via a user interface of a user device, with a digital communication message associated with each of the set of digital communications. The operations of 1005 may be performed according to the methods described herein. In some examples, aspects of the operations of 1005 may be performed by an user engagement metadata interface as described with reference to FIGS. 5 through 7.

At 1010, the database server may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata. The operations of 1010 may be performed according to the methods described herein. In some examples, aspects of the operations of 1010 may be performed by a frequency grouping component as described with reference to FIGS. 5 through 7.

At 1015, the database server may select a set of transmission frequency ranges from the set of transmission frequency groups. The operations of 1015 may be performed according to the methods described herein. In some examples, aspects of the operations of 1015 may be performed by a frequency range selection component as described with reference to FIGS. 5 through 7.

At 1020, the database server may redistribute, for each transmission frequency range of the set of transmission frequency ranges, a number of communication messages from each transmission frequency group of the set of transmission frequency groups outside of the transmission frequency range to transmission frequency groups within the transmission frequency range. The operations of 1020 may be performed according to the methods described herein. In some examples, aspects of the operations of 1020 may be performed by a redistribution component as described with reference to FIGS. 5 through 7.

At 1025, the database server may calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range. The operations of 1025 may be performed according to the methods described herein. In some examples, aspects of the operations of 1025 may be performed by a prediction calculation component as described with reference to FIGS. 5 through 7.

At 1030, the database server may select a range of the set of transmission frequency ranges based on the predicted engagement rate. The operations of 1030 may be performed according to the methods described herein. In some examples, aspects of the operations of 1030 may be performed by an optimal frequency range selection component as described with reference to FIGS. 5 through 7.

At 1035, the database server may select the range of the set of transmission frequency ranges based on maximizing the number of clicks per user receiving a transmitted digital communication message. The operations of 1035 may be performed according to the methods described herein. In some examples, aspects of the operations of 1035 may be performed by an optimal frequency range selection component as described with reference to FIGS. 5 through 7.

At 1040, the database server may select the range of the set of transmission frequency ranges based on a maximizing the number of opened messages per user receiving a transmitted digital communication message. The operations of 1040 may be performed according to the methods described herein. In some examples, aspects of the operations of 1040 may be performed by an optimal frequency range selection component as described with reference to FIGS. 5 through 7.

Figure 11:
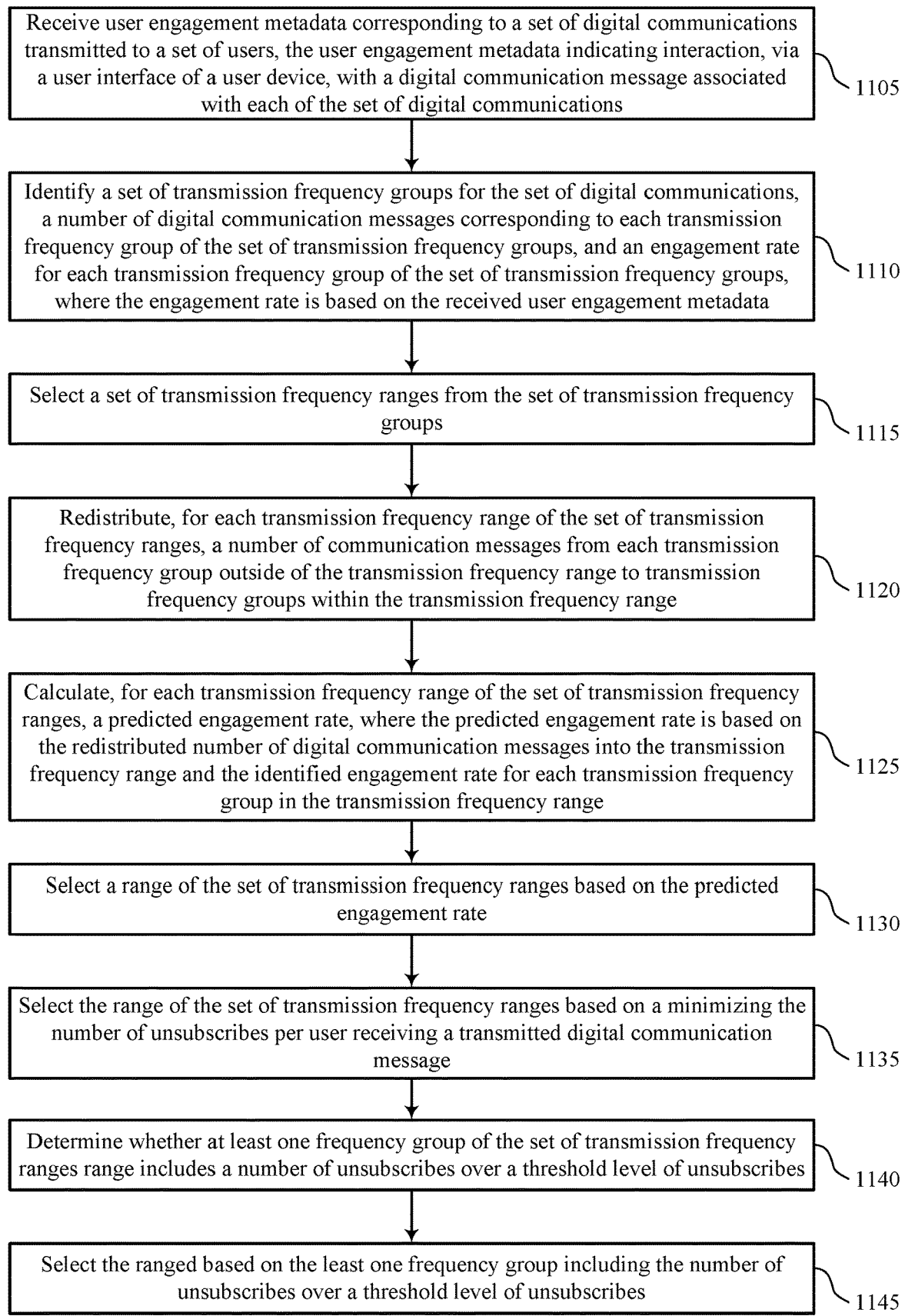

FIG. 11 shows a flowchart illustrating a method 1100 that supports communication frequency optimization in accordance with aspects of the present disclosure. The operations of method 1100 may be implemented by a database server or its components as described herein. For example, the operations of method 1100 may be performed by a communication optimization module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1105, the database server may receive user engagement metadata corresponding to a set of digital communications transmitted to a set of users, the user engagement metadata indicating interaction, via a user interface of a user device, with a digital communication message associated with each of the set of digital communications. The operations of 1105 may be performed according to the methods described herein. In some examples, aspects of the operations of 1105 may be performed by an user engagement metadata interface as described with reference to FIGS. 5 through 7.

At 1110, the database server may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata. The operations of 1110 may be performed according to the methods described herein. In some examples, aspects of the operations of 1110 may be performed by a frequency grouping component as described with reference to FIGS. 5 through 7.

At 1115, the database server may select a set of transmission frequency ranges from the set of transmission frequency groups. The operations of 1115 may be performed according to the methods described herein. In some examples, aspects of the operations of 1115 may be performed by a frequency range selection component as described with reference to FIGS. 5 through 7.

At 1120, the database server may redistribute, for each transmission frequency range of the set of transmission frequency ranges, a number of communication messages from each transmission frequency group of the set of transmission frequency groups outside of the transmission frequency range to transmission frequency groups within the transmission frequency range. The operations of 1120 may be performed according to the methods described herein. In some examples, aspects of the operations of 1120 may be performed by a redistribution component as described with reference to FIGS. 5 through 7.

At 1125, the database server may calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range. The operations of 1125 may be performed according to the methods described herein. In some examples, aspects of the operations of 1125 may be performed by a prediction calculation component as described with reference to FIGS. 5 through 7.

At 1130, the database server may select a range of the set of transmission frequency ranges based on the predicted engagement rate. The operations of 1130 may be performed according to the methods described herein. In some examples, aspects of the operations of 1130 may be performed by an optimal frequency range selection component as described with reference to FIGS. 5 through 7.

At 1135, the database server may select the range of the set of transmission frequency ranges based on a minimizing the number of unsubscribes per user receiving a transmitted digital communication message. The operations of 1135 may be performed according to the methods described herein. In some examples, aspects of the operations of 1135 may be performed by an optimal frequency range selection component as described with reference to FIGS. 5 through 7.

At 1140, the database server may determine whether at least one frequency group of the set of transmission frequency ranges range includes a number of unsubscribes over a threshold level of unsubscribes. The operations of 1140 may be performed according to the methods described herein. In some examples, aspects of the operations of 1140 may be performed by an optimal frequency range selection component as described with reference to FIGS. 5 through 7.

At 1145, the database server may select the ranged based on the least one frequency group including the number of unsubscribes over a threshold level of unsubscribes. The operations of 1145 may be performed according to the methods described herein. In some examples, aspects of the operations of 1145 may be performed by an optimal frequency range selection component as described with reference to FIGS. 5 through 7.

Figure 12:
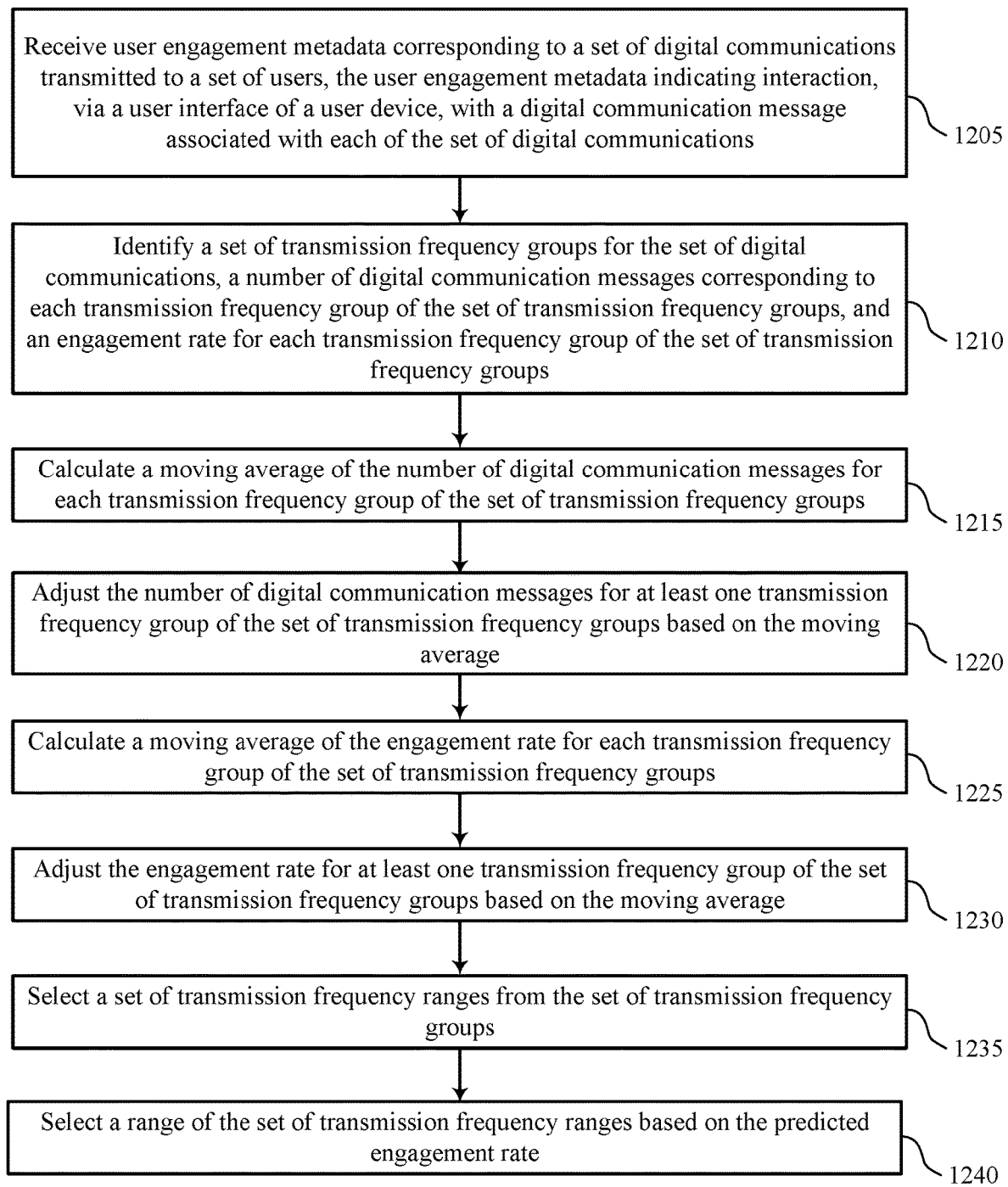

FIG. 12 shows a flowchart illustrating a method 1200 that supports communication frequency optimization in accordance with aspects of the present disclosure. The operations of method 1200 may be implemented by a database server or its components as described herein. For example, the operations of method 1200 may be performed by a communication optimization module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1205, the database server may receive user engagement metadata corresponding to a set of digital communications transmitted to a set of users, the user engagement metadata indicating interaction, via a user interface of a user device, with a digital communication message associated with each of the set of digital communications. The operations of 1205 may be performed according to the methods described herein. In some examples, aspects of the operations of 1205 may be performed by a user engagement metadata interface as described with reference to FIGS. 5 through 7.

At 1210, the database server may identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata. The operations of 1210 may be performed according to the methods described herein. In some examples, aspects of the operations of 1210 may be performed by a frequency grouping component as described with reference to FIGS. 5 through 7.

At 1215, the database server may calculate a moving average of the number of digital communication messages for each transmission frequency group of the set of transmission frequency groups. The operations of 1215 may be performed according to the methods described herein. In some examples, aspects of the operations of 1215 may be performed by a frequency grouping component as described with reference to FIGS. 5 through 7.

At 1220, the database server may adjust the number of digital communication messages for at least one transmission frequency group of the set of transmission frequency groups based on the moving average. The operations of 1220 may be performed according to the methods described herein. In some examples, aspects of the operations of 1220 may be performed by a frequency grouping component as described with reference to FIGS. 5 through 7.

At 1225, the database server may calculate a moving average of the engagement rate for each transmission frequency group of the set of transmission frequency groups. The operations of 1225 may be performed according to the methods described herein. In some examples, aspects of the operations of 1225 may be performed by a frequency grouping component as described with reference to FIGS. 5 through 7.

At 1230, the database server may adjust the engagement rate for at least one transmission frequency group of the set of transmission frequency groups based on the moving average. The operations of 1230 may be performed according to the methods described herein. In some examples, aspects of the operations of 1230 may be performed by a frequency grouping component as described with reference to FIGS. 5 through 7.

At 1235, the database server may select a set of transmission frequency ranges from the set of transmission frequency groups. The operations of 1235 may be performed according to the methods described herein. In some examples, aspects of the operations of 1235 may be performed by a frequency range selection component as described with reference to FIGS. 5 through 7.

At 1240, the database server may select a range of the set of transmission frequency ranges based on a predicted engagement rate. The ranges may be selected from a set and numbers of messages are redistributed as described herein and engagement rates may be calculated for each range as described herein. The operations of 1240 may be performed according to the methods described herein. In some examples, aspects of the operations of 1240 may be performed by an optimal frequency range selection component as described with reference to FIGS. 5 through 7.

A method is described. The method may include receiving user engagement metadata corresponding to a set of digital communications transmitted to a set of users, the user engagement metadata indicating interaction, via a user interface of a user device, with a digital communication message associated with each of the set of digital communications, identifying a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata, selecting a set of transmission frequency ranges from the set of transmission frequency groups, redistributing, for each transmission frequency range of the set of transmission frequency ranges, a number of communication messages from each transmission frequency group of the set of transmission frequency groups outside of the transmission frequency range to transmission frequency groups within the transmission frequency range, calculating, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range, and selecting a range of the set of transmission frequency ranges based on the predicted engagement rate.

An apparatus is described. The apparatus may include a processor, memory in electronic communication with the processor, and instructions stored in the memory. The instructions may be executable by the processor to cause the apparatus to receive user engagement metadata corresponding to a set of digital communications transmitted to a set of users, the user engagement metadata indicating interaction, via a user interface of a user device, with a digital communication message associated with each of the set of digital communications, identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata, select a set of transmission frequency ranges from the set of transmission frequency groups, redistribute, for each transmission frequency range of the set of transmission frequency ranges, a number of communication messages from each transmission frequency group of the set of transmission frequency groups outside of the transmission frequency range to transmission frequency groups within the transmission frequency range, calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range, and select a range of the set of transmission frequency ranges based on the predicted engagement rate.

Another apparatus is described. The apparatus may include means for receiving user engagement metadata corresponding to a set of digital communications transmitted to a set of users, the user engagement metadata indicating interaction, via a user interface of a user device, with a digital communication message associated with each of the set of digital communications, identifying a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata, selecting a set of transmission frequency ranges from the set of transmission frequency groups, redistributing, for each transmission frequency range of the set of transmission frequency ranges, a number of communication messages from each transmission frequency group of the set of transmission frequency groups outside of the transmission frequency range to transmission frequency groups within the transmission frequency range, calculating, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range, and selecting a range of the set of transmission frequency ranges based on the predicted engagement rate.

A non-transitory computer-readable medium storing code is described. The code may include instructions executable by a processor to receive user engagement metadata corresponding to a set of digital communications transmitted to a set of users, the user engagement metadata indicating interaction, via a user interface of a user device, with a digital communication message associated with each of the set of digital communications, identify a set of transmission frequency groups for the set of digital communications, a number of digital communication messages corresponding to each transmission frequency group of the set of transmission frequency groups, and an engagement rate for each transmission frequency group of the set of transmission frequency groups, where the engagement rate is based on the received user engagement metadata, select a set of transmission frequency ranges from the set of transmission frequency groups, redistribute, for each transmission frequency range of the set of transmission frequency ranges, a number of communication messages from each transmission frequency group of the set of transmission frequency groups outside of the transmission frequency range to transmission frequency groups within the transmission frequency range, calculate, for each transmission frequency range of the set of transmission frequency ranges, a predicted engagement rate, where the predicted engagement rate is based on the redistributed number of digital communication messages into the transmission frequency range and the identified engagement rate for each transmission frequency group in the transmission frequency range, and select a range of the set of transmission frequency ranges based on the predicted engagement rate.

In some examples of the method, apparatuses, and non-transitory computer-readable medium described herein, redistributing, for each transmission frequency range of the set of transmission frequency ranges, the number of communication messages users from each transmission frequency group of the set of transmission frequency groups outside of the transmission frequency range to the transmission frequency groups within the transmission frequency range further may include operations, features, means, or instructions for determining whether the number of digital communication messages, within each transmission frequency range, satisfies at least one redistribution condition.

In some examples of the method, apparatuses, and non-transitory computer-readable medium described herein, the engagement rate may include operations, features, means, or instructions for selecting the range of the set of transmission frequency ranges based on maximizing the number of clicks per user receiving a transmitted digital communication message.

In some examples of the method, apparatuses, and non-transitory computer-readable medium described herein, the engagement rate may include operations, features, means, or instructions for selecting the range of the set of transmission frequency ranges based on a maximizing the number of opened messages per user receiving a transmitted digital communication message.

In some examples of the method, apparatuses, and non-transitory computer-readable medium described herein, the engagement rate may include operations, features, means, or instructions for selecting the range of the set of transmission frequency ranges based on a minimizing the number of unsubscribes per user receiving a transmitted digital communication message.

Some examples of the method, apparatuses, and non-transitory computer-readable medium described herein may further include operations, features, means, or instructions for determining whether at least one frequency group of the set of transmission frequency ranges range includes a number of unsubscribes over a threshold level of unsubscribes, and selecting the ranged based on the least one frequency group including the number of unsubscribes over a threshold level of unsubscribes.

Some examples of the method, apparatuses, and non-transitory computer-readable medium described herein may further include operations, features, means, or instructions for calculating a moving average of the number of digital communication messages for each transmission frequency group of the set of transmission frequency groups, and adjusting the number of digital communication messages for at least one transmission frequency group of the set of transmission frequency groups based on the moving average.

Some examples of the method, apparatuses, and non-transitory computer-readable medium described herein may further include operations, features, means, or instructions for calculating a moving average of the engagement rate for each transmission frequency group of the set of transmission frequency groups, and adjusting the engagement rate for at least one transmission frequency group of the set of transmission frequency groups based on the moving average.

In some examples of the method, apparatuses, and non-transitory computer-readable medium described herein, redistributing, for each transmission frequency range of the set of transmission frequency ranges, the number of digital communication messages from each transmission frequency group of the set of transmission frequency groups outside of the transmission frequency range to the transmission frequency groups within the transmission frequency range further may include operations, features, means, or instructions for redistributing the number of digital communication messages on a pro-rata basis.

A method is described. The method may include calculating, for one or more of the set of transmission frequency groups, a rolling sum of engagements based on the identified engagement rates for each of the transmission frequency groups of the set of transmission frequency groups, where the engagements are unsubscribes, identifying a center group of an engagement range based on the rolling sum satisfying a threshold level of engagements, and selecting a lower bound of the engagement range as frequency groups with a frequency less than the center group and an upper bound of the engagement range as frequency groups with a frequency greater than the center group.

An apparatus is described. The apparatus may include a processor, memory in electronic communication with the processor, and instructions stored in the memory. The instructions may be executable by the processor to cause the apparatus to calculate, for one or more of the set of transmission frequency groups, a rolling sum of engagements based on the identified engagement rates for each of the transmission frequency groups of the set of transmission frequency groups, where the engagements are unsubscribes, identify a center group of an engagement range based on the rolling sum satisfying a threshold level of engagements, and select a lower bound of the engagement range as frequency groups with a frequency less than the center group and an upper bound of the engagement range as frequency groups with a frequency greater than the center group.

Another apparatus is described. The apparatus may include means for calculating, for one or more of the set of transmission frequency groups, a rolling sum of engagements based on the identified engagement rates for each of the transmission frequency groups of the set of transmission frequency groups, where the engagements are unsubscribes, identifying a center group of an engagement range based on the rolling sum satisfying a threshold level of engagements, and selecting a lower bound of the engagement range as frequency groups with a frequency less than the center group and an upper bound of the engagement range as frequency groups with a frequency greater than the center group.

A non-transitory computer-readable medium storing code is described. The code may include instructions executable by a processor to calculate, for one or more of the set of transmission frequency groups, a rolling sum of engagements based on the identified engagement rates for each of the transmission frequency groups of the set of transmission frequency groups, where the engagements are unsubscribes, identify a center group of an engagement range based on the rolling sum satisfying a threshold level of engagements, and select a lower bound of the engagement range as frequency groups with a frequency less than the center group and an upper bound of the engagement range as frequency groups with a frequency greater than the center group.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein

What is claimed is:
1. A method comprising:
receiving user engagement metadata corresponding to a plurality of digital communications transmitted to a plurality of users, the user engagement metadata indicating interaction, via a user interface of a user device, with a digital communication message associated with each of the plurality of digital communications;
identifying a set of transmission frequency groups for the plurality of digital communications, a number of digital communication messages corresponding to each transmission frequency group of the set of transmission frequency groups, and an engagement rate for each transmission frequency group of the set of transmission frequency groups, wherein the engagement rate is based at least in part on the received user engagement metadata;
selecting a plurality of transmission frequency ranges from the set of transmission frequency groups;
redistributing, for each transmission frequency range of the plurality of transmission frequency ranges, a number of digital communication messages from each transmission frequency group of the set of transmission frequency groups outside of the transmission frequency range to transmission frequency groups within the transmission frequency range;
calculating, for each transmission frequency range of the plurality of transmission frequency ranges, a predicted engagement, wherein the predicted engagement is based at least in part on the redistributed number of digital communication messages into the transmission frequency range and the identified engagement rate for each transmission frequency group in the transmission frequency range; and selecting a range of the plurality of transmission frequency ranges based at least in part on the predicted engagement indicating an increase or decrease in user engagement within the range.

2. The method of claim 1, wherein redistributing, for each transmission frequency range of the plurality of transmission frequency ranges, the number of communication messages from each transmission frequency group of the set of transmission frequency groups outside of the transmission frequency range to the transmission frequency groups within the transmission frequency range further comprises:

determining whether the number of digital communication messages, within each transmission frequency range, satisfies at least one redistribution condition.

3. The method of claim 2, wherein the at least one redistribution condition includes a minimum number of users, a maximum number of users, or a combination thereof.

4. The method of claim 1, wherein the engagement rate comprises a number of clicks per transmitted digital communication, the method further comprising:

selecting the range of the plurality of transmission frequency ranges based at least in part on maximizing the number of users that click messages.

5. The method of claim 1, wherein the engagement rate comprises a number of opened messages per transmitted digital communication, the method further comprising:

selecting the range of the plurality of transmission frequency ranges based at least in part on a maximizing the number of users that open digital communication messages.

6. The method of claim 1, wherein the engagement rate comprises a number of unsubscribes per transmitted digital communication, the method further comprising:

selecting the range of the plurality of transmission frequency ranges based at least in part on controlling the number of unsubscribes per user receiving a transmitted digital communication message.

7. The method of claim 1, further comprising:

calculating, for one or more of the set of transmission frequency groups, a rolling sum of engagements based on the identified engagement rates for each of the transmission frequency groups of the set of transmission frequency groups, wherein the engagements are unsubscribes;

identifying a center group of an engagement range based on the rolling sum satisfying a threshold level of engagements; and selecting a lower bound of the engagement range as frequency groups with a frequency less than the center group and an upper bound of the engagement range as frequency groups with a frequency greater than the center group.

8. The method of claim 1, further comprising:

calculating a moving average of the number of digital communication messages for each transmission frequency group of the set of transmission frequency groups; and adjusting the number of digital communication messages for at least one transmission frequency group of the set of transmission frequency groups based on the moving average.

9. The method of claim 1, further comprising:

calculating a moving average of engagements for each transmission frequency group of the set of transmission frequency groups; and adjusting the engagement rate for at least one transmission frequency group of the set of transmission frequency groups based on the moving average.

10. The method of claim 1, wherein redistributing, for each transmission frequency range of the plurality of transmission frequency ranges, the number of digital communication messages from each transmission frequency group of the set of transmission frequency groups outside of the transmission frequency range to the transmission frequency groups within the transmission frequency range further comprises:

redistributing the number of digital communication messages on a pro-rata basis.

11. The method of claim 1, wherein the transmitted digital communication messages comprise transmitted emails and wherein the user engagement metadata indicates whether a user opened, clicked, or unsubscribed to the digital communication message associated with at least one of the plurality of digital communications.

12. An apparatus comprising, comprising:

a processor, memory in electronic communication with the processor; and instructions stored in the memory and executable by the processor to cause the apparatus to:

receive user engagement metadata corresponding to a plurality of digital communications transmitted to a plurality of users, the user engagement metadata indicating interaction, via a user interface of a user device, with a digital communication message associated with each of the plurality of digital communications;

identify a set of transmission frequency groups for the plurality of digital communications, a number of digital communication messages corresponding to each transmission frequency group of the set of transmission frequency groups, and an engagement rate for each transmission frequency group of the set of transmission frequency groups, wherein the engagement rate is based at least in part on the received user engagement metadata;

select a plurality of transmission frequency ranges from the set of transmission frequency groups;

redistribute, for each transmission frequency range of the plurality of transmission frequency ranges, a number of communication messages from each transmission frequency group of the set of transmission frequency groups outside of the transmission frequency range to transmission frequency groups within the transmission frequency range;

calculate, for each transmission frequency range of the plurality of transmission frequency ranges, a predicted engagement, wherein the predicted engagement is based at least in part on the redistributed number of digital communication messages into the transmission frequency range and the identified engagement rate for each transmission frequency group in the transmission frequency range; and select a range of the plurality of transmission frequency ranges based at least in part on the predicted engagement indicating an increase or decrease in user engagement within the range.

13. The apparatus of claim 12, wherein the instructions to redistributing, for each transmission frequency range of the plurality of transmission frequency ranges, the number of communication messages from each transmission frequency group of the set of transmission frequency groups outside of the transmission frequency range to the transmission frequency groups within the transmission frequency range further are executable by the processor to cause the apparatus to:
   determine whether the number of digital communication messages, within each transmission frequency range, satisfies at least one redistribution condition, wherein the at least one redistribution condition includes a minimum number of users, a maximum number of users, or a combination thereof.

14. The apparatus of claim 12, wherein the engagement rate comprises a number of clicks per transmitted digital communication, and the instructions are further executable by the processor to cause the apparatus to:
   select the range of the plurality of transmission frequency ranges based at least in part on maximizing the number of users that click a received digital communication messages.

15. The apparatus of claim 12, wherein the engagement rate comprises a number of opened messages per transmitted digital communication, and the instructions are further executable by the processor to cause the apparatus to:
   select the range of the plurality of transmission frequency ranges based at least in part on a maximizing the number of users that open a received digital communication messages.

16. The apparatus of claim 12, wherein the engagement rate comprises a number of unsubscribes per transmitted digital communication, and the instructions are further executable by the processor to cause the apparatus to:
   select the range of the plurality of transmission frequency ranges based at least in part on controlling a number of unsubscribes per user receiving a transmitted digital communication message.

17. A non-transitory computer-readable medium storing code, the code comprising instructions executable by a processor to:
   receive user engagement metadata corresponding to a plurality of digital communications transmitted to a plurality of users, the user engagement metadata indicating interaction, via a user interface of a user device, with a digital communication message associated with each of the plurality of digital communications;
   identify a set of transmission frequency groups for the plurality of digital communications, a number of digital communication messages corresponding to each transmission frequency group of the set of transmission frequency groups, and an engagement rate for each transmission frequency group of the set of transmission frequency groups, wherein the engagement rate is based at least in part on the received user engagement metadata;
   select a plurality of transmission frequency ranges from the set of transmission frequency groups;
   redistribute, for each transmission frequency range of the plurality of transmission frequency ranges, a number of communication messages from each transmission frequency group of the set of transmission frequency groups outside of the transmission frequency range to transmission frequency groups within the transmission frequency range;
   calculate, for each transmission frequency range of the plurality of transmission frequency ranges, a predicted engagement, wherein the predicted engagement is based at least in part on the redistributed number of digital communication messages into the transmission frequency range and the identified engagement rate for each transmission frequency group in the transmission frequency range; and
   select a range of the plurality of transmission frequency ranges based at least in part on the predicted engagement indicating an increase or decrease in user engagement within the range.

18. The non-transitory computer-readable medium of claim 17, wherein the engagement rate comprises a number of subscribers clicking messages per transmitted digital communication, and the instructions are executable to:
   select the range of the plurality of transmission frequency ranges based at least in part on maximizing the number of users that click a digital communication message.

19. The non-transitory computer-readable medium of claim 17, wherein the engagement rate comprises a number of subscribers opening messages per transmitted digital communication, and the instructions are executable to:
   select the range of the plurality of transmission frequency ranges based at least in part on a maximizing the number of users that open a digital communication message.

20. The non-transitory computer-readable medium of claim 17, wherein the engagement rate comprises a number of unsubscribes per transmitted digital communication, and the instructions are executable to:
   select the range of the plurality of transmission frequency ranges based at least in part on a controlling the number of unsubscribes per user receiving a transmitted digital communication message.

* * * * *